United States Patent
Layotte

[11] 3,835,954
[45] Sept. 17, 1974

[54] APPARATUS FOR INDUCING SHEAR WAVES IN THE EARTH

[75] Inventor: Pierre Claude Layotte, Royan, France

[73] Assignee: Institut Francais du Petrole, des Carburants et Lubrifiants, Rueil-Malmaison, France

[22] Filed: Feb. 2, 1972

[21] Appl. No.: 223,682

[30] Foreign Application Priority Data
Feb. 5, 1971 France .............................. 71.04041

[52] U.S. Cl. .......................... 181/.5 EC, 181/.5 XC
[51] Int. Cl. ............................................. G01v 1/10
[58] Field of Search ............ 181/.5 EC, .5 XC, .5 A, 181/.5 VM; 340/15.5 SW

[56] References Cited
UNITED STATES PATENTS

| | | | |
|---|---|---|---|
| 2,019,497 | 11/1935 | Kuntze | 181/.5 A |
| 2,101,859 | 12/1937 | Kunze | 181/.5 A |
| 2,772,746 | 12/1956 | Merten | 181/.5 NC |
| 3,347,336 | 10/1967 | Nash | 181/.5 EC |
| 3,511,333 | 5/1970 | Cholet | 181/.5 EC |
| 3,587,774 | 6/1971 | Bemrose | 181/.5 NC |

Primary Examiner—Benjamin A. Borchelt
Assistant Examiner—J. V. Doramus
Attorney, Agent, or Firm—Craig & Antonelli

[57] ABSTRACT

Apparatus for inducing shear waves in the earth, comprising a rigid enclosure including a dome-shaped wall and a surface for coupling to the earth, means for detonating an explosive charge in said enclosure under such conditions as to create a lateral dissymmetry of the explosive forces applied to said wall in order to produce a lateral resultant force parallel to said coupling surface and means for transmitting said resultant force to the ground, thereby inducing shear waves therein.

20 Claims, 7 Drawing Figures

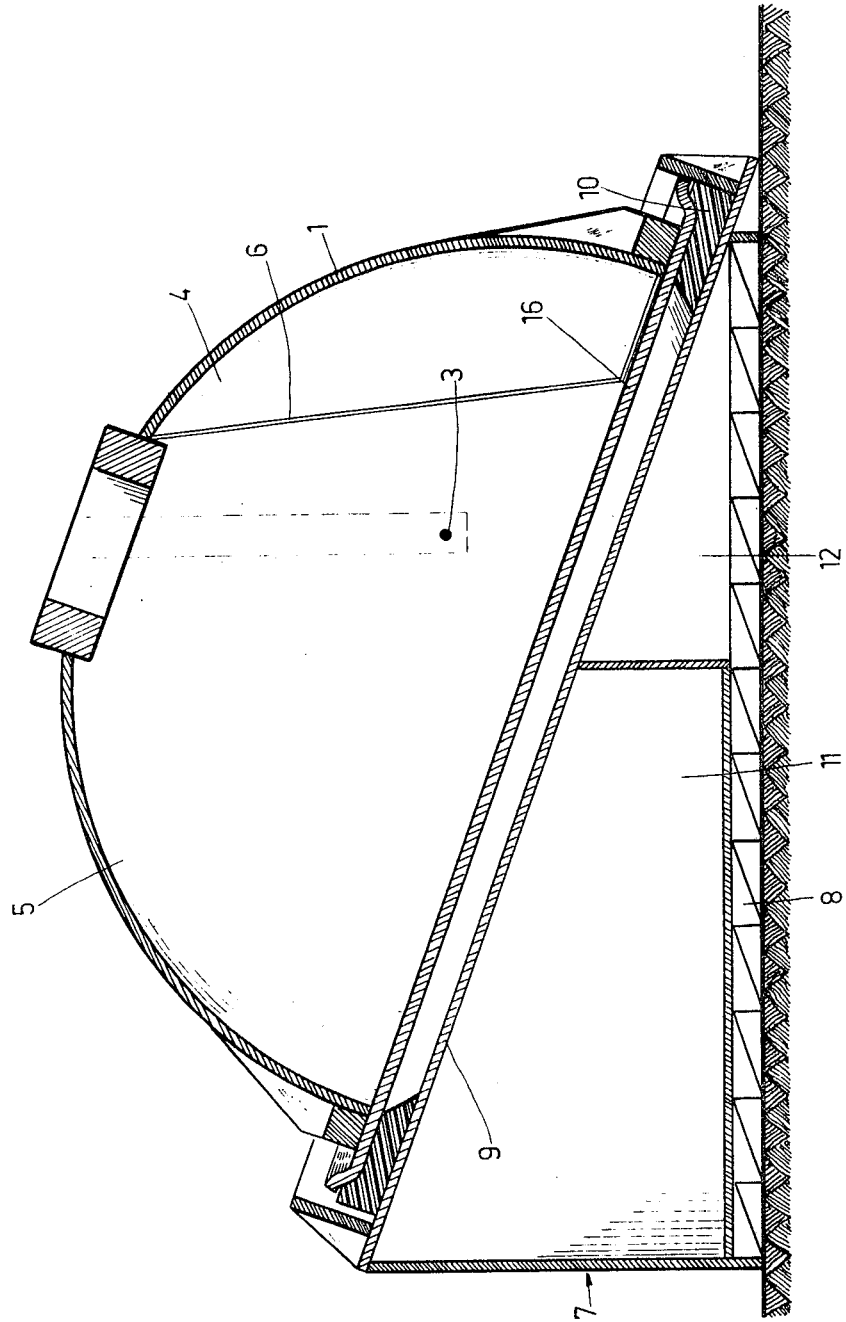

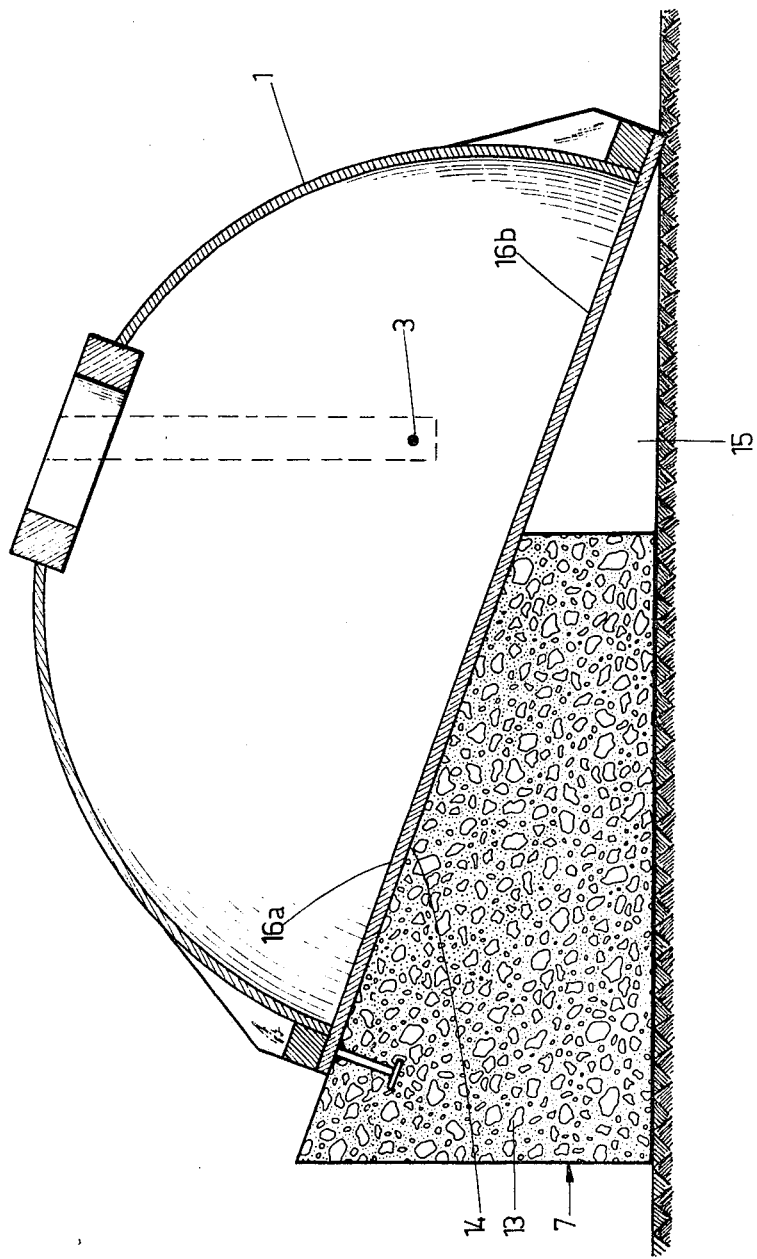

APPARATUS FOR INDUCING SHEAR WAVES IN THE EARTH

This invention relates to an apparatus for seismic prospecting by inducing shear waves in the earth.

Seismic prospecting makes use mainly of the so-called longitudinal acoustic waves which propagate through deep strata by expansion. There can be used also acoustic waves propagating through deep strata by distortion, which are commonly called shear waves. Two types of shear waves are known:

the shear waves which impart to the particles a horizontal motion whose detected component is perpendicular to the vertical plane passing through the seismic line, called SH waves, and the shear waves which impart to the particles a horizontal motion whose detected component is contained in the vertical plane passing through the seismic line, called SV waves.

The use of acoustic shear waves is of great interest. As a matter of fact the shear waves, at equal frequency, have a shorter wave length than that of the longitudinal waves and exhibit accordingly, a greater partition efficiency. Moreover, the SH waves present the particular feature, under certain conditions, of being not liable to a conversion in the presence of stratigraphic discontinuities. The recordings of these waves are consequently much simpler.

The combined use of longitudinal and shear waves offers, in addition, the advantage of making it possible to determine certain physical parameters of the formations such as Young's modulus, Poisson's ratio, rigidity modulus and compressibility modulus, the knowledge of which is particularly useful in the field of geotechniques.

Among the known devices for inducing shear wave in the earth, there can be mentioned those described in U.S. Pats. Nos. 3,159,233 and 3,286,783 which relate to horizontal vibrators imparting alternative horizontal motions, by friction, to the surface on which they are applied.

These devices suffer from the drawback that the transmitted pulses are of a long duration, in most cases several seconds; it is then necessary to subject the obtained recordings to a mathematical transformation so as to restore conditions corresponding to the transmission of the short pulses.

An other known process, described in U.S. Pat. No. 2,740,488 consists, for example, in propelling a mass against an abutment member fastened to the ground. This device, however, has the disadvantage of requiring several preliminary drilling operations for firmly anchoring the abutment member to the ground.

It is an object of the present invention to avoid these disadvantages by providing an apparatus for inducing acoustic shear waves in the earth, which comprises a rigid enclosure provided with a surface for coupling the same to the earth and means for explosively generating forces within said enclosure, further remarkable by the provision, in addtion, of means for generating a lateral dissymmetry in the distribution of the explosive forces over the wall of said enclosure, said forces having a component parallel to said coupling surface.

More particularly the invention concerns a surface apparatus formed by an enclosure provided with means for generating therein acoustic shear waves, e.g by explosion of small charges, in such a manner as to upset the spherical symmetry of the explosively generated waves in order to impart to the earth a tangential force during a short time. This enclosure is rigidly fastened to a ground coupling surface. The lateral dissymmetry of the explosion forces applied to the enclosure, whose resultant, transmitted to the earth, induces shear waves therein, may be achieved either by pulling into place and actuating means for generating explosive forces at an off center position in the enclosure, or by placing in said enclosure lateraly dissymmetrical bodies of materials having different coefficients of absorption of the shock waves, or still by combining such means.

The most significant advantages of the invention are the following:

a. It provides for the transmission to the earth of shear stresses of high energy and reproductible with a very great stability.

b. It gives means for performing very easily a high number of shots when necessary, in order to investigate at a sufficient depth.

c. It makes it possible to produce stresses in opposite directions and to select the shear waves in accordance to their polarization characteristics.

The distinctive characteristic of the waves resulting from directional stresses is in the fact that when the direction of action of these stresses is changed by 180°, the phase of the vibrations corresponding to the shear waves also changes by 180°.

d. The device according to the invention is not only portable and easily handled and put into place, but also has the advantage of a low manufacturing cost.

Other advantages of the invention and distinctive features of the device will be made apparent from the following description of non-limitative embodiments of the invention, by way of example with reference to the accompanying drawings in which:

FIG. 3 shows a non-limitative embodiment of apparatus according to the invention, and FIG. 4 illustrates a modified embodiment of the device shown in FIG. 3.

Figure 1A:
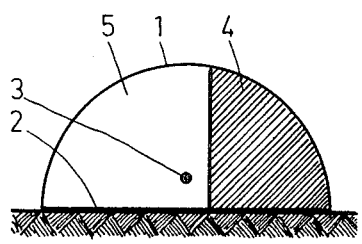
FIGS. 1A, 1B and 1C are simplified diagrams illustrating the operating principle of a first embodiment of the invention.
Figure 1B:
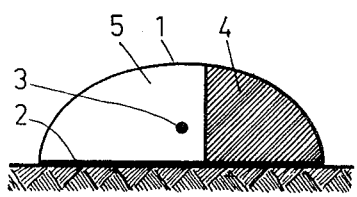
Figure 1C:
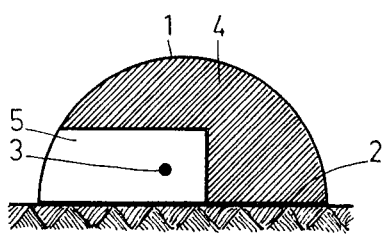

The first embodiment of the invention, illustrated in FIGS. 1A, 1B and 1C comprises means for placing the explosive charge into an enclosure 1 having a surface 2 for coupling it to the earth. An absorbing material 4 is placed laterally, in a non-symmetrical manner, inside the enclosure. The explosive charge 3 is placed close to the surface delimiting the part of the enclosure containing the absorbing material. The remaining part of the enclosure contains a low absorption medium 5 (e.g water) insuring the propagation of the shock waves generated by explosion of the charge 3. Due to the uneven absorption of the shock waves there is created a resultant tangential force acting on the surface of application of the enclosure against the ground, said force being not zero.

This resultant force induces in the ground shear waves which propagate therethrough. These waves are polarized along a direction corresponding to the compartment of low absorption of the enclosure 1.

The enclosure may be semispherical (FIG. 1A). It will be advantageously elliptical with a substantial eccentricity (FIG. 1B). In both cases the absorption zone is a portion of one of the two lateral halves of the enclosure. It is also possible to locate the absorbing volume so that a semispherical enclosure will act as an elliptical one. This effect will be obtained by locating the absorbing material partly in one of the lateral halves of the semispherical enclosure and partly in the upper part thereof, above the explosive charge 3, as shown in FIG. 1C.

Figure 2A:
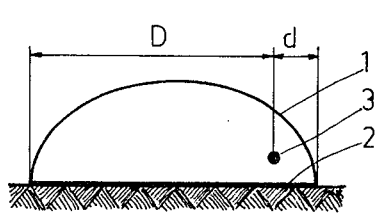
FIGS. 2A and 2B are simplified diagrams illustrating the operating principle of a second embodiment of the invention.
Figure 2B:
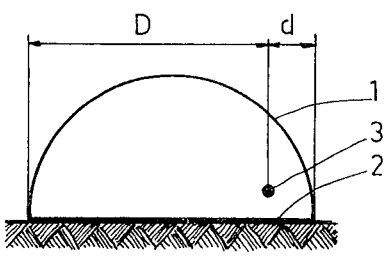

A second embodiment of the invention is illustrated by FIGS. 2A and 2B.

An explosive charge 3 is placed in a semispherical or preferably ellipsoidal enclosure 1. This enclosure is filled up with a liquid of very low absorption coefficient (e.g. water) and is coupled to the ground. The explosive charge is placed in the enclosure, in a diametral plane in the case of a semi-spherical enclosure, and preferably in a plane containing the longitudinal axis in the case of an ellipsoidal enclosure. The selected position is remote from the center. In this second embodiment the ambient atmosphere external to the enclosure is used as absorption zone. The acoustic waves are considerably more absorbed therein than in the liquid inside the enclosure. In view of the off-center position of the charge 3, this absorption zone is placed also dissymmetrically with respect to the explosion point. As a result thereof there are generated tangential forces which impart to the ground, to which the enclosure is coupled, directional stresses.

The direction of said stresses is in a plane containing the point of location of the charge and the center of the enclosure.

The embodiment of apparatus diagrammatically shown in FIG. 3 comprises, for example, a semispherical enclosure 1, closed at its lower part by a membrane 16 permeable to the acoustic waves. The interior of the enclosure is divided into two compartments 4 and 5 separated by a membrane 6. The compartment 4, delimited by a portion of the enclosure wall and by the membrane 6, contains air used as absorption agent for the acoustic waves. The compartment 5 is filled up with water. The explosive charge 3 is placed in the compartment 5 of the enclosure in the vicinity of the membrane 6 separating the two compartments. The explosive charge may be contained in an explosive cartridge. In this case it may be advantageous to make use of a cartridge loading system similar to that described in the French patent 1,475,622, together with a loading tube extending inside the enclosure, at one end of which the cartridges, forced by a water stream, come to an abutment position and are fired.

The apparatus further comprises a coupling member 7 of the membrane 16 to the ground surface. Said member is wedge-shaped and rests on the ground by means of a plate 8 provided with sharp edges distributed over its whole surface. The enclosure 5 is laid down on or fastened to the inclined surface 9 of member 7 through an annular support 10. The wedge-shaped member 7 is particularly efficient for converting the explosive energy to tangential stresses and subjecting the ground to elastic deformations.

The edges distributed over the surface of plate 8 make easier the transmission to the ground of the generated tangential stresses.

The member 7 is hollow and divided into two compartments 11 and 12. The compartment 12 is filled with air and located vertically below the explosion point.

The vertical component of the explosive force applied to the ground through the member 7 is attenuated by absorption in the air contained in compartment 12. Compartment 11 is filled up with water and offset with respect to the vertical line passing through the explosion point.

It insures a good transmission to the ground of the lateral components of the explosion force.

In the embodiment of apparatus illustrated in FIG. 4, the coupling member 7 comprises a base member 13 made of a material of low absorption with regard to the acoustic waves, e.g concrete or cement, and resting directly on the ground surface. This base member has a surface 14, inclined with respect to the ground surface, on which is laid down the membrane 16. The enclosure is fastened to the base member so that only a portion 16A of the membrane is in contact with the base member, the other portion 16B delimiting a wedge-shaped air volume 15 with the ground surface. The enclosure 1 is, for example, semi-spherical. It is completely filled with a material of low absorption coeffecient (e. g.water). The explosive charge 3 is placed at a point of the enclosure remote from the center and substantially vertically above the air volume 15.

By this way, the vertical component of the forces generated by the explosion is substantially attenuated through the air volume and the resultant of the forces having a horizontal component is transmitted to the ground through the base member 13. In order to improve the transmission to the ground of the tangential stresses generated by the explosion, the surface of the base member 13 in contact with the ground may also be provided with sharp edges or corrugations.

The explosive energy can be liberated inside the enclosure by using exploding wires instead of cartridges or still by creating an electric arc between electrodes.

In the described embodiments air is used as absorbing fluid. It is obvious that, instead of air there can be used other fluids or absorbing solid materials such as, for example, expanded polystyrene, rubber foam, sand and the like.

The apparatus will be operated as follows:

a. When it is desired to transmit shear waves of the SV type, the apparatus is oriented in the direction of the axis of the seismic line object of the survey. The diametral vertical plane containing the point of location of the charge and the symmetry axis of the absorbing zone, will be arranged substantially parallel to the vertical plane passing through the seismic line. The seismographs are put in line in the same plane.

b. When it is desired to transmit shear waves of the SH type, the apparatus is oriented in a direction perpendicular to the seismic line. The above-defined diametral plane will be oriented in a direction substantially perpendicular to the line of the seismographs.

These two operations may be performed with a single transmitter but it may be desirable to make use of several transmitters in order to improve the detection of the shear waves according to the polarization principle.

Two transmitters, for example, are so oriented with respect to the seismic line of study so that they transmit shear waves of the SH type in two opposite directions. The two transmitters are actuated successively and a recording is performed for each one. One of the recordings is then substracted from the other. It is also possible, by using several transmitters conveniently oriented with respect to the seismic line of study, to favor the filtering of parasitic propagations.

The embodiments of apparatus given by way of example and their method of operation are of course not limitative. The enclosure may be given an ellipsoidal shape or any other shape adapted to produce a lateral dissymmetry of the shock waves applied to the enclosure.

It would not be out of the scope of the invention to make use of a coupling member 7 formed of a single compartment filled with a material of low absorption coefficient or still of a base member 13 whose inclined surface is sufficient for contacting the entire membrane 16 which is the bottom closing member of the enclosure.

More generally it will be understood that, while there have been given certain specific examples of the practice of this invention, one skilled in the art can easily ascertain the essential characteristics thereof and, without departing the essential from the spirit and scope of the invention, can make various changes and modifications thereof to adapt it to various usages and conditions. Consequently, such changes and modifications are properly, equitably and intended to be within the full range of equivalence of the following claims.

What I claim is:

1. An apparatus for inducing shear waves in the earth comprising:
   a rigid enclosure having a wall and a coupling surface to the earth;
   means for generating explosive forces from a volume of explosive material which is confined within a space of the enclosure whose volume is small with respect to the volume of the enclosure; and
   means for suspending said generating means within said enclosure, the interior of said enclosure dissymmetrically surrounding said generating means, so that the distribution of the explosive forces which are applied by way of said coupling surface to the earth have a substantial component parallel to the surface of the earth.

2. An apparatus for inducing shear waves in the earth comprising:
   a rigid enclosure having a wall and a coupling surface to the earth;
   means for generating explosive forces from a volume of explosive material which is confined within a space of the enclosure whose volume is small with respect to the volume of the enclosure; and
   means for suspending said generating means at an off-center position within said enclosure and for actuating the same, the interior of said enclosure dissymmetrically surrounding said generating means so that the distribution of the explosive forces which are applied by way of said coupling surface to the earth have a substantial component parallel to the surface of the earth.

3. An apparatus for inducing shear waves in the earth comprising:
   a rigid enclosure having a wall and a coupling surface to the earth;
   means for generating explosive forces from a volume of explosive material which is confined within a space of the enclosure whose volume is small with respect to the volume of the enclosure; and
   means for suspending said generating means within said enclosure, the interior of said enclosure dissymmetrically surrounding said generating means, so that the distribution of the explosive forces which are applied by way of said coupling surface to the earth have a substantial component parallel to the surface of the earth, said enclosure including volumes of substances having different absorption coefficients with respect to the shock waves and laterally placed in a dissymmetrical manner inside the enclosure.

4. An apparatus for inducing shear waves in the earth comprising:
   a rigid enclosure having a wall transparent to acoustic waves;
   means for generating explosive forces from a volume of explosive material which is confined within a space of the enclosure whose volume is small with respect to the volume of the enclosure; and
   means for suspending said generating means within said enclosure, the interior of said enclosure dissymmetrically surrounding said generating means, so that the distribution of the explosive forces which are applied by way of said coupling surface to the earth have a substantial component parallel to the surface of the earth, said enclosure including a member for coupling said wall to the ground having at least one upper surface inclined with respect to the ground surface and in contact, at least partly, with the wall transparent to the acoustic waves.

5. An apparatus according to claim 4 wherein the coupling member is formed of at least two substances having different absorption coefficients with respect to the shock waves and arranged in such a manner that the substance having the higher absorption coefficient is placed vertically below the explosion point.

6. An apparatus as claimed in claim 5 wherein said substance having the higher absorption coefficient is air.

7. An apparatus according to claim 4, wherein the coupling member is a solid member in contact with a portion of said transparent wall, the other portion of said wall defining with the ground surface a volume filled with a substance having an absorption coefficient higher than that of said solid member and located vertically below said means for generating explosive forces.

8. An apparatus for inducing shear waves in the earth comprising:
   a rigid enclosure having a wall portion and a surface portion for coupling acoustic energy to the earth; and
   means, disposed within said enclosure, for generating explosive forces from a volume of explosive material which is confined within a space of the enclosure whose volume is small with respect to the volume of the enclosure and for causing the force acting on said surface portion of said rigid enclosure, resulting from shock waves caused by said explosive forces within said enclosure, to have a component tangential to the surface of the earth, including means for suspending said volume of explosive material within said enclosure, the interior of said enclosure dissymmetrically surrounding said volume of explosive material, so that the distribution of the explosive forces which are applied by way of said surface portion to the earth have a substantial component parallel to the surface of the earth, whereby shear waves will be induced through said surface portion of said enclosure into the earth.

9. An apparatus according to claim 8, wherein said means comprises an explosive charge positioned at a preselected location within said enclosure and a low absorption medium confined within said enclosure spaced apart from said explosive charge.

10. An apparatus according to claim 9, wherein said low absorption medium is disposed partially in one of the lateral halves of said enclosure and partially in the upper part thereof displaced from said surface portion.

11. An apparatus according to claim 8, wherein said means comprises an explosive charge positioned at a preselected location within said enclosure displaced with respect to the center thereof.

12. An apparatus according to claim 8, wherein said surface portion of said enclosure includes an acoustic wave permeable membrane and further including a wedge-shaped acoustic coupling member to one surface of which said membrane is coupled and another surface of which, inclined with respect to said one surface, is positioned on the surface of the earth.

13. An apparatus according to claim 12, wherein said means comprises an explosive charge positioned at a preselected location within said enclosure and a medium, having an acoustic absorption characteristic different with respect to the medium in which said explosive charge is positioned, confined within said enclosure spaced apart from said explosive charge.

14. An apparatus according to claim 13, wherein said enclosure further includes a further membrane extending from the wall of said enclosure to the membrane making up said surface portion of said enclosure, so as to divide the interior of said enclosure into first and second portions, in the first of which said explosive charge is positioned and in the second of which said medium is confined.

15. An apparatus according to claim 14, wherein said first portion of said enclosure is filled with water and said second portion is filled with air.

16. An apparatus according to claim 12, wherein said wedge-shaped acoustic coupling member contains first and second compartments respectively confining first and second media having different acoustic absorption characteristics.

17. An apparatus according to claim 14, wherein said wedge-shaped acoustic coupling member contains first and second compartments respectively confining first and second media having different acoustic absorption characteristics.

18. An apparatus according to claim 16, wherein said explosive charge is vertically positioned, with respect to said another surface of said wedge-shaped acoustic coupling member, above the one of said compartments, the medium in which compartment has the lesser degree of acoustic transmissivity with respect to the medium in the other of said compartments.

19. An apparatus according to claim 12, wherein said another surface of said wedge-shaped acoustic coupling member includes a plate provided with a plurality of acute-angle edges distributed over the entire surface thereof facing the ground surface.

20. An apparatus according to claim 18, wherein each of said enclosure, first compartment and second compartment of said wedge-shaped acoustic coupling member confines a respective medium having a relatively different acoustic absorption characteristic.

* * * * *